US012329189B2

(12) United States Patent
Digard et al.

(10) Patent No.: US 12,329,189 B2
(45) Date of Patent: Jun. 17, 2025

(54) METHOD OF MAKING A TOBACCO EXTRACT

(71) Applicant: NICOVENTURES TRADING LIMITED, London (GB)

(72) Inventors: Helena Digard, London (GB); Geoff Foss-Smith, London (GB); Francis Cheung, London (GB)

(73) Assignee: NICOVENTURES TRADING LIMITED, London (GB)

( * ) Notice: Subject to any disclaimer, the term of this patent is extended or adjusted under 35 U.S.C. 154(b) by 558 days.

(21) Appl. No.: 16/614,269

(22) PCT Filed: May 9, 2018

(86) PCT No.: PCT/EP2018/062122
§ 371 (c)(1),
(2) Date: Nov. 15, 2019

(87) PCT Pub. No.: WO2018/210680
PCT Pub. Date: Nov. 22, 2018

(65) Prior Publication Data
US 2021/0153543 A1 May 27, 2021

(30) Foreign Application Priority Data
May 15, 2017 (GB) .................................. 1707767

(51) Int. Cl.
| | |
|---|---|
| *A24B 15/167* | (2020.01) |
| *A24B 15/24* | (2006.01) |
| *A24F 40/10* | (2020.01) |
| *A24F 40/42* | (2020.01) |
| *B01D 11/02* | (2006.01) |

(52) U.S. Cl.
CPC ............ *A24B 15/167* (2016.11); *A24B 15/24* (2013.01); *A24F 40/10* (2020.01); *A24F 40/42* (2020.01); *B01D 11/0203* (2013.01); *B01D 11/0288* (2013.01); *B01D 11/0292* (2013.01)

(58) Field of Classification Search
CPC .............................. A24B 15/167; A24B 15/24
See application file for complete search history.

(56) References Cited

U.S. PATENT DOCUMENTS

| | | | |
|---|---|---|---|
| RE12,994 E * | 7/1909 | Gloystein | 546/279.4 |
| 3,880,172 A * | 4/1975 | Anderson | A24B 15/16 131/359 |
| 4,144,895 A * | 3/1979 | Fiore | A24B 15/26 131/298 |
| 4,153,063 A | 5/1979 | Roselius | |
| 4,506,682 A | 3/1985 | Muller | |
| 4,561,452 A | 12/1985 | Gahrs | |
| 4,727,889 A | 3/1988 | Niven | |
| 4,756,318 A | 7/1988 | Clearman et al. | |
| 5,018,540 A | 5/1991 | Grubbs et al. | |
| 5,025,812 A | 6/1991 | Fagg et al. | |
| 5,073,267 A | 12/1991 | Adda | |
| 5,119,835 A | 6/1992 | Heemann et al. | |
| 5,301,694 A * | 4/1994 | Raymond | A24B 15/24 426/429 |
| 5,318,050 A | 6/1994 | Gonzalez-Parra et al. | |
| 5,435,325 A | 7/1995 | Clapp et al. | |
| 5,497,792 A | 3/1996 | Prasad et al. | |
| 5,617,881 A | 4/1997 | Kossmehl et al. | |
| 7,726,320 B2 * | 6/2010 | Robinson | A24D 1/20 131/194 |
| 8,479,747 B2 | 7/2013 | O'Connell | |
| 8,887,737 B2 | 11/2014 | Howell et al. | |
| 8,955,523 B2 * | 2/2015 | Coleman, III | A24B 15/24 131/297 |
| 9,022,040 B2 | 5/2015 | Murphy | |
| 9,402,415 B2 | 8/2016 | Coleman, III et al. | |
| 9,527,011 B2 | 12/2016 | Jonsson et al. | |
| 9,554,595 B2 | 1/2017 | Buchberger | |
| 10,123,560 B2 | 11/2018 | Rasouli et al. | |
| 10,375,996 B2 | 8/2019 | Aoun et al. | |
| 10,426,199 B2 | 10/2019 | Turner et al. | |
| 11,511,056 B2 | 11/2022 | Hepworth et al. | |
| 11,612,702 B2 | 3/2023 | Bowen et al. | |
| 2002/0114853 A1 | 8/2002 | Krasutsky | |
| 2004/0025891 A1 | 2/2004 | McAdam et al. | |
| 2006/0196517 A1 | 9/2006 | Gedevanishvili et al. | |

(Continued)

FOREIGN PATENT DOCUMENTS

| | | |
|---|---|---|
| CN | 1440699 A | 9/2003 |
| CN | 1459256 A | 12/2003 |

(Continued)

OTHER PUBLICATIONS

International Search Report and Written Opinion, Application No. PCT/EP2018/062122, mailed Jul. 31, 2018, 15 pages.
Anonymous: "iFUSE—The Heat not Burn Hybrid—Heat Not Burn," Jan. 4, 2017 (Jan. 4, 2017), XP055493889. Retrieved from the Internet: URL: https://heatnotburn.co.uk/ifuse-heat-not-burn-hybrid/ [retrieved on Jul. 19, 2018], pp. 1-15.
Anonymous: "Where Does the Nicotine Used in Electronic Cigarettes Come From?," Quora—Aug. 23, 2015 (Aug. 23, 2015), XP055494026, Retrieved from the Internet: URL: https://www.quora.com/Where-does-the-nicotine-used-in-electronic-cigarettes-come-from, [retrieved on Jul. 19, 2018], 2 pages.
International Preliminary Report on Patentability for Application No. PCT/EP2018/062119, mailed on Nov. 28, 2019, 8 pages.
International Preliminary Report on Patentability for Application No. PCT/EP2018/062120, mailed on Nov. 28, 2019, 9 pages.

(Continued)

*Primary Examiner* — Russell E Sparks
(74) *Attorney, Agent, or Firm* — Womble Bond Dickinson (US) LLP; Mark R. DeLuca

(57) ABSTRACT

Embodiments described herein include a method of making a tobacco extract involving two sets of supercritical conditions for extraction and subcritical conditions for separation. Also described herein are a tobacco extract obtainable by such methods, a smoking article containing such a tobacco extract, a cartridge for a smoking article containing such an extract and use of such a tobacco extract to generate an inhalable aerosol.

12 Claims, No Drawings

(56) References Cited

U.S. PATENT DOCUMENTS

| | | |
|---|---|---|
| 2007/0023058 A1 | 2/2007 | Howell et al. |
| 2007/0137663 A1 | 6/2007 | Taylor et al. |
| 2007/0193595 A1 | 8/2007 | Haruki et al. |
| 2008/0257367 A1 | 10/2008 | Paterno et al. |
| 2009/0032036 A1 | 2/2009 | Uematsu et al. |
| 2011/0159160 A1 | 6/2011 | Jonsson et al. |
| 2011/0259353 A1 | 10/2011 | Coleman, III et al. |
| 2012/0006341 A1 | 1/2012 | Schmekel et al. |
| 2012/0125354 A1 | 5/2012 | Byrd et al. |
| 2012/0145170 A1 | 6/2012 | O'Connell |
| 2012/0152265 A1 | 6/2012 | Dube et al. |
| 2012/0167901 A1 | 7/2012 | Onno |
| 2012/0199145 A1 | 8/2012 | Byrd et al. |
| 2012/0318287 A1 | 12/2012 | Andersen |
| 2013/0008457 A1 | 1/2013 | Zheng et al. |
| 2013/0160777 A1 | 6/2013 | Murphy |
| 2013/0239981 A1 | 9/2013 | Sun et al. |
| 2013/0255702 A1 | 10/2013 | Griffith, Jr. et al. |
| 2014/0096780 A1 | 4/2014 | Gerardi |
| 2014/0190500 A1 | 7/2014 | Duan et al. |
| 2014/0238396 A1 | 8/2014 | Buchberger |
| 2014/0261483 A1 | 9/2014 | Hopps |
| 2015/0027453 A1 | 1/2015 | Tessmann |
| 2015/0150305 A1 | 6/2015 | Shenkal |
| 2015/0374035 A1 | 12/2015 | Sanchez et al. |
| 2016/0081395 A1 | 3/2016 | Thorens et al. |
| 2016/0100626 A1 | 4/2016 | Ishida |
| 2016/0106144 A1 | 4/2016 | Muehlbauer et al. |
| 2016/0205992 A1 | 7/2016 | Bell et al. |
| 2019/0320718 A1 | 10/2019 | Yilmaz et al. |
| 2020/0068946 A1 | 3/2020 | Foss-Smith et al. |
| 2020/0146334 A1 | 5/2020 | Digard et al. |
| 2021/0106051 A1 | 4/2021 | Han et al. |
| 2021/0153542 A1 | 5/2021 | Sintyureva |
| 2021/0153544 A1 | 5/2021 | Sintyureva |
| 2021/0153546 A1 | 5/2021 | Digard |
| 2021/0169128 A1 | 6/2021 | Sintyureva et al. |

FOREIGN PATENT DOCUMENTS

| | | |
|---|---|---|
| CN | 1899142 A | 1/2007 |
| CN | 101247739 A | 8/2008 |
| CN | 101338248 A | 1/2009 |
| CN | 101830941 A | 9/2010 |
| CN | 102106602 A | 6/2011 |
| CN | 102199490 A | 9/2011 |
| CN | 102326859 A | 1/2012 |
| CN | 102488318 A | 6/2012 |
| CN | 102640985 A | 8/2012 |
| CN | 102894469 A | 1/2013 |
| CN | 102994228 A | 3/2013 |
| CN | 103060094 A | 4/2013 |
| CN | 103230094 A | 8/2013 |
| CN | 103235066 A | 8/2013 |
| CN | 103242960 A | 8/2013 |
| CN | 103462206 A | 12/2013 |
| CN | 103468403 A | 12/2013 |
| CN | 103484245 A | 1/2014 |
| CN | 103720030 A | 4/2014 |
| CN | 103783651 A | 5/2014 |
| CN | 103783660 A | 5/2014 |
| CN | 103881817 A | 6/2014 |
| CN | 104489912 A | 4/2015 |
| DE | 554139 C | 7/1932 |
| EP | 0280817 A2 | 9/1988 |
| EP | 0323699 | 7/1989 |
| EP | 0338831 A2 | 10/1989 |
| EP | 0434333 A2 | 6/1991 |
| EP | 0443761 A1 | 8/1991 |
| EP | 0822247 A2 | 2/1998 |
| EP | 0941140 B1 | 11/2002 |
| EP | 0845220 B1 | 9/2003 |
| EP | 1355708 A2 | 10/2003 |
| EP | 1267650 B1 | 12/2005 |
| EP | 1815899 A1 | 8/2007 |
| EP | 1915064 A1 | 4/2008 |
| EP | 1980163 A1 | 10/2008 |
| EP | 2303425 A1 | 4/2011 |
| EP | 2544560 A1 | 1/2013 |
| EP | 2560509 A1 | 2/2013 |
| EP | 2008534 B1 | 7/2013 |
| EP | 2640204 A1 | 9/2013 |
| EP | 2523568 B1 | 12/2013 |
| EP | 2727477 A2 | 5/2014 |
| EP | 1951074 B1 | 7/2014 |
| EP | 2769631 A1 | 8/2014 |
| EP | 1915064 B1 | 4/2017 |
| GB | 1357645 A | 6/1974 |
| GB | 2173985 A | 10/1986 |
| GB | 2515883 A | 1/2015 |
| JP | S519838 A | 1/1976 |
| JP | S62176504 A | 8/1987 |
| JP | S63229102 A | 9/1988 |
| JP | H0249572 A | 2/1990 |
| JP | H03127975 A | 5/1991 |
| JP | H069986 A | 1/1994 |
| JP | H0698746 A | 4/1994 |
| JP | H07227502 A | 8/1995 |
| JP | H0819389 A | 1/1996 |
| JP | H0823952 A | 1/1996 |
| JP | H0910502 A | 1/1997 |
| JP | 3014704 B2 | 2/2000 |
| JP | 3223058 B2 | 10/2001 |
| JP | 2001276603 A | 10/2001 |
| JP | 3325028 B2 | 9/2002 |
| JP | 2005532821 A | 11/2005 |
| JP | 2007136404 A | 6/2007 |
| JP | 2008055255 A | 3/2008 |
| JP | 2009502160 A | 1/2009 |
| JP | 2014530633 A | 11/2014 |
| JP | 2017511703 A | 4/2017 |
| KR | 20170040787 A | 4/2017 |
| KR | 20170046938 A | 5/2017 |
| RU | 2250717 C2 | 4/2005 |
| RU | 2250718 C2 | 4/2005 |
| RU | 2250724 C2 | 4/2005 |
| RU | 2250734 C2 | 4/2005 |
| RU | 2250739 C2 | 4/2005 |
| WO | WO-9808584 A1 | 3/1998 |
| WO | WO-0165954 A1 | 9/2001 |
| WO | WO-0226343 A2 | 4/2002 |
| WO | WO-2004008888 A1 | 1/2004 |
| WO | WO-2007052159 A2 | 5/2007 |
| WO | WO-2007053096 A1 | 5/2007 |
| WO | WO-2007053097 A1 | 5/2007 |
| WO | WO-2007053098 A1 | 5/2007 |
| WO | WO-2008026446 A1 | 3/2008 |
| WO | WO-2009019514 A2 | 2/2009 |
| WO | WO-2009156763 A1 | 12/2009 |
| WO | WO-2011088171 A2 | 7/2011 |
| WO | WO-2011110843 A1 | 9/2011 |
| WO | WO-2011133633 A1 | 10/2011 |
| WO | WO-2012068375 A1 | 5/2012 |
| WO | WO-2012174677 A1 | 12/2012 |
| WO | WO-2013060827 A1 | 5/2013 |
| WO | WO-2013142483 A1 | 9/2013 |
| WO | WO-2013187402 A1 | 12/2013 |
| WO | WO-2014058837 A1 | 4/2014 |
| WO | WO-2014094337 A1 | 6/2014 |
| WO | WO 2015107552 | 7/2015 |
| WO | WO-2015177177 A1 | 11/2015 |
| WO | WO-2016005709 A1 | 1/2016 |
| WO | WO-2016024083 A1 | 2/2016 |
| WO | WO-2016062777 A1 | 4/2016 |
| WO | WO-2016135331 A1 | 9/2016 |
| WO | WO-2016184977 A1 | 11/2016 |
| WO | 2018210675 A1 | 11/2018 |
| WO | 2018210676 A1 | 11/2018 |
| WO | 2018210677 A1 | 11/2018 |
| WO | 2018210678 A1 | 11/2018 |
| WO | 2018210679 A1 | 11/2018 |

(56) References Cited

FOREIGN PATENT DOCUMENTS

| | | |
|---|---|---|
| WO | 2018210680 A1 | 11/2018 |
| WO | 2018210681 A2 | 11/2018 |

OTHER PUBLICATIONS

International Preliminary Report on Patentability for Application No. PCT/EP2018/062122, mailed on Nov. 28, 2019, 9 pages.
International Preliminary Report on Patentability for Application No. PCT/EP2018/062116, mailed on Nov. 28, 2019, 8 pages.
International Preliminary Report on Patentability for Application No. PCT/EP2018/062121, mailed on Nov. 28, 2019, 8 pages.
International Preliminary Report on Patentability for Application No. PCT/EP2018/062123, mailed on Nov. 28, 2019, 10 pages.
International Preliminary Report on Patentability for Application No. PCT/EP2018/062117, mailed on Nov. 28, 2019, 8 pages.
International Search Report and Written Opinion for Application No. PCT/EP2018/062116, mailed on Aug. 20, 2018, 22 pages.
International Search Report and Written Opinion for Application No. PCT/EP2018/062117, mailed on Jul. 31, 2018, 14 pages.
International Search Report and Written Opinion for Application No. PCT/EP2018/062119, mailed on Jul. 30, 2018, 10 pages.
International Search Report and Written Opinion for Application No. PCT/EP2018/062120, mailed on Jul. 30, 2018, 15 pages.
International Search Report and Written Opinion for Application No. PCT/EP2018/062121, mailed on Jul. 30, 2018, 14 pages.
International Search Report and Written Opinion for Application No. PCT/EP2018/062123, mailed on Nov. 28, 2018, 19 pages.
Marcolli C., et al., "Water Activity in Polyol/Water Systems: New UNIFAC Parameterization," Atmospheric Chemistry and Physics, Copernicus GMBH, Germany, Retrieved from the Internet: URL: http://www.atmos-chemphys.net/5/1545/2005/acp-5-1545-2005.pdf, [retrieved on Nov. 26, 2014], vol. 5 (6), Jun. 1, 2005, pp. 1545-1555.
Notice of Reasons for Refusal for Japanese Application No. 2019-562269, mailed on Mar. 2, 2021, 12 pages.
Office Action for Japanese Application No. 2019-562270, mailed on Dec. 8, 2020, 6 pages.
Office Action For Japanese Application No. 2019-562304, mailed on Dec. 1, 2020, 6 pages.
Office Action for Japanese Application No. 2019-562384, mailed on Dec. 1, 2020, 5 pages.
Office Action For Korean Application No. 10-2019-7033531, mailed on Aug. 24, 2021, 12 pages.
Office Action for Korean Application No. 10-2019-7033532 mailed on Feb. 7, 2021, 9 pages.
Office Action For Korean Application No. 10-2019-7033534, mailed on Aug. 24, 2021, 13 pages.
Office Action For Korean Application No. 10-2019-7033535, mailed on Aug. 24, 2021, 12 pages.
Office Action For Korean Application No. 10-2019-7033533, mailed on Aug. 24, 2021, 12 pages.
Office Action mailed Apr. 24, 2020 for Russian Application No. 2019136484, 18 pages.
Search Report for Japanese Application No. 2019-562269, mailed Feb. 17, 2021, 20 pages.
"Boiling Points and Structures of Hydrocarbons", 2003, [online], Virtual Chembook, Elmhurst College, Retrieved from, http://chemistry.elmhurst.edu/vchembook/501hcboilingpts.html, on Apr. 27, 2022, 1 page.
Merriam-Webster, "Definition of Through," Retrieved from https://www.merriam-webster.com/dictionary/through, 2022, 9 pages.
Munters., "Sieve Trays," 2022, Retrieved from the Internet: https://www.munters.com/en/munters/products/mass-transfer/sieve-trays/, 4 pages.
Office Action for Canadian Application No. 3,062,987, mailed on Oct. 7, 2022, 4 pages.
Office Action for Japanese Application No. 2019-562289, mailed on Dec. 8, 2020, 6 pages.
Office Action mailed Feb. 2, 2021 for Japanese Application No. 2019-562273, 24 pages.
"Tray Column &Tray Types," Plant operations: Trays Types, 2016, Retrieved from the Internet: http://www.separationprocesses.com/Operations/POT_Chp02a.htm, 2 pages.
Office Action received for Japanese Patent Application No. 2019-562289, mailed on Dec. 8, 2020, 6 pages (3 pages of English Translation and 3 pages of Official Copy).

* cited by examiner

METHOD OF MAKING A TOBACCO EXTRACT

PRIORITY CLAIM

The present application is a National Phase entry of PCT Application No. PCT/EP2018/062122, filed May 9, 2018, which claims priority from GB Patent Application No. 1707767.8, filed May 15, 2017.

TECHNICAL FIELD

The present invention relates to a method of making a tobacco extract and to the tobacco extract resulting from that process. The invention also provides cartridges containing the tobacco extract for use in a smoking article, and smoking articles comprising the tobacco extract.

BACKGROUND

Tobacco material is heated in smoking articles for the purpose of releasing substances contained in the material and delivering these as an aerosol.

Smoking articles such as cigarettes, cigars and the like burn tobacco during use to create tobacco smoke. Attempts have been made to provide alternatives to these articles that burn tobacco by creating products that release compounds without burning. Examples of such products are heating devices which release compounds by heating, but not burning, material. The material may be, for example, tobacco or other non-tobacco products, which may or may not contain nicotine.

Electronic cigarettes or "e-cigarettes" are another product that has been formulated as an alternative to combustible products. These devices contain a volatilizable solution which generates an inhalable aerosol on heating. These solutions may contain components of tobacco. It is therefore useful to be able to selectively extract tobacco components.

EP1915064 describes a process for making reconstituted tobacco including a tobacco extraction step. The extraction process uses supercritical carbon dioxide to extract tobacco components, and then contacts the supercritical carbon dioxide containing tobacco components with propylene glycol. The tobacco components transfer into the propylene glycol. The carbon dioxide is supercritical throughout.

SUMMARY

According to a first aspect of the present invention, there is provided a method of making a tobacco extract comprising;
(a) contacting tobacco with an extraction solvent at a first temperature and first pressure which are selected such that the extraction solvent is supercritical, such that tobacco flavor and/or aroma components are extracted from the tobacco into the solvent;
(b) separating the residual tobacco solids from the supercritical extraction solvent containing tobacco components;
(c) exposing the extraction solvent containing tobacco components to conditions in a vessel at which the extraction solvent is subcritical, thereby releasing the tobacco components from the extraction solvent,
(d) contacting the residual tobacco solids with an extraction solvent at a second temperature and second pressure which are selected such that the extraction solvent is supercritical, such that nicotine are extracted from the tobacco into the extraction solvent;
and wherein the second temperature and/or second pressure is higher than the respective first temperature or first pressure;
(e) separating the tobacco solids from the supercritical extraction solvent containing tobacco components;
(f) exposing the extraction solvent containing tobacco components to conditions in a vessel at which the extraction solvent is subcritical, thereby releasing the tobacco components from the extraction solvent, wherein during step (f), the vessel contains an entrapment solvent which dissolves the tobacco components released from the extraction solvent, and wherein the entrapment solvent comprises an aerosol generating agent.

In one embodiment, the vessel in step (c) contains an entrapment solvent which
dissolves the tobacco components separated from the extraction solvent, and wherein the entrapment solvent comprises an aerosol generating agent. In some cases, the same entrapment solvent may be used in steps (c) and (f), i.e. the entrapment solvent used in step (c) may be retained and used again in step (f).

The inventors have established that variations in the extraction process using a supercritical extraction solvent result in variation in the tobacco extract composition and/or in the physical properties of the extract.

The inventors have found that different components are extracted under different conditions. In the first extraction step (a), the supercritical conditions are less harsh (i.e. at least one of the first temperature and pressure is lower than the respective second temperature and pressure), and the inventors have determined that flavors and aromas are extracted without degradation of these volatile compounds. Harsher conditions have been found to cause decomposition of some volatile (low molecular weight) tobacco components, which affects the flavor profile. The concentration of higher molecular weight compounds, such as nicotine and non-volatile compounds, that are extracted in step (a) is low. In some embodiments, higher molecular weight compounds such as nicotine are not substantially dissolved/extracted under the conditions in step (a).

The harsher conditions used in step (d) have been found to efficiently extract nicotine and non-volatile compounds.

In embodiments where the liquid output from step (c) is separate from the liquid output resulting from step (f), the process may include an additional step (g) of mixing these liquids. The relative ratios on mixing can be selected to control the formulation of the mixed liquid.

Presence of the entrapment solvent results in a tobacco extract that is immediately suitable for use in an electronic cigarette or the like. The transfer to subcritical conditions allows for efficient and effective separation of the tobacco components and extraction solvent. This means that the concentration of tobacco components in the entrapment solvent (i.e. in the tobacco extract) is higher and the chemical make-up is different as compared to the process of EP1915064 (in which the extraction solvent is supercritical throughout). This improves the organoleptic properties of the extract.

Moreover, the extract resulting from the EP1915064 process has a lower viscosity than that resulting from the process according to the present invention; this is because the supercritical extraction solvent of EP1915064 contacts the propylene glycol entrapment solvent, and gaseous carbon dioxide becomes entrained in the propylene glycol. A higher viscosity extract is better for use in smoking articles because the extract is easier to handle and easier to contain/retain in the article.

The use of two sets of supercritical conditions is also advantageous, in that less energy is required to maintain the system at the first conditions and the process is consequently cheaper to run.

The use of subcritical conditions for separation is also advantageous over a process in which the conditions are such that the extraction solvent is supercritical throughout because less energy is required to maintain the conditions. The process is therefore more energy efficient, cheaper to run and is quicker to set up.

In some cases, the entrapment solvent consists essentially or of consists of one or more aerosol generating agents.

In some cases, the extraction solvent used in the above process comprises carbon dioxide. In some cases, the extraction solvent consists essentially of or consists of carbon dioxide.

Where the extraction solvent comprises carbon dioxide, the pressure at which step (a) occurs may, in some cases, be from about 8 MPa, 9 MPa or 10 MPa, to about 15 MPa, 12 MPa, 11 MPa or 10 MPa, suitably from 8-15 MPa, 9-12 MPa or about 9-11 MPa, suitably 10 MPa. Where the extraction solvent comprises carbon dioxide, the temperature at which step (a) extraction occurs may, in some cases, be from about 308K, 313K or 316K to about 328K, 323K, or 320K, suitably from 308-328K, 313-323K, or 316-320K, suitably about 318K.

Where the extraction solvent comprises carbon dioxide, the pressure at which step (d) occurs may, in some cases, be from about 15 MPa, 20 MPa or 25 MPa, to about 85 MPa, 70 MPa, 55 MPa, 40 MPa or 30 MPa, suitably from 15-85 MPa, 20-55 MPa or about 25-30 MPa, suitably 26 MPa. Where the extraction solvent comprises carbon dioxide, the temperature at which step (d) extraction occurs may, in some cases, be from about 328K, 333K or 336K to about 473K, 430K, 390K, 350K or 340K, suitably from 328-473K, 333-430K, or 333-340K.

In some cases, the entrapment solvent used in the above method comprises a polyol. In some cases, the entrapment solvent comprises glycerol and/or propylene glycol. In some cases, the entrapment solvent consists essentially of or consists of glycerol.

In some cases, the method described herein may further comprise the step of providing the entrapment solvent containing dissolved tobacco components (i.e. the tobacco extract) in a cartridge, wherein the cartridge is configured for use in a smoking article.

According to a second aspect of the invention, there is provided a tobacco extract obtained by or obtainable by a method described herein.

According to a further aspect, there is provided a cartridge configured for use in a smoking article, the cartridge containing a tobacco extract obtained by or obtainable by a method described herein. The cartridge may be configured for use in an electronic cigarette.

According to a further aspect, there is provided the use of a tobacco extract obtained by or obtainable by a method described herein to generate an inhalable aerosol. In some cases, the tobacco extract is used in a smoking article to generate the inhalable aerosol.

According to a further aspect, there is provided a smoking article containing a tobacco extract obtained by or obtainable by a method described herein. In some cases, the smoking article may contain the tobacco extract in an insertable cartridge, the cartridge being configured for use in the smoking article. The smoking article may additionally comprise a mouthpiece. The smoking article may additionally comprise a heater which volatilizes the entrapment solvent containing tobacco extract in use.

The smoking article may be an electronic cigarette.

Further features and advantages of the invention will become apparent from the following description of preferred embodiments of the invention, given by way of example only.

DETAILED DESCRIPTION

For the avoidance of doubt, the term "tobacco extract" as used herein refers to the liquid output resulting from any of steps (c), (f) and (g) above. Typically, the extract will be tobacco components dissolved in the entrapment solvent.

The phrase "nicotine is not substantially dissolved/extracted" may, in some cases, mean that less than 15 wt %, suitably 12 wt %, 10 wt %, 8 wt %, 6 wt % or 4 wt %
(calculated based on the tobacco dry weight) of the nicotine in the tobacco starting material is dissolved in the extraction solvent.

The extraction solvent may comprise or may be a supercritical fluid in some steps of the method described herein. A supercritical fluid is any substance where, at a temperature and pressure above its critical point, distinct liquid and gas phases do not exist. Supercritical fluids can effuse through solids like a gas, and dissolve materials like a liquid. Supercritical fluids have a higher fluid density than gases and therefore have a higher solvent capacity.

In some cases, one or more flavors may be added to the tobacco extract. As used herein, the term "flavor" refers to materials which, where local regulations permit, may be used to create a desired taste or aroma in a product for adult consumers.

They may include extracts (e.g., licorice, hydrangea, Japanese white bark magnolia leaf, chamomile, fenugreek, clove, menthol, Japanese mint, aniseed, cinnamon, herb, wintergreen, cherry, berry, peach, apple, Drambuie® (honeyed whisky liqueur), bourbon, scotch, whiskey, spearmint, peppermint, lavender, cardamom, celery, cascarilla, nutmeg, sandalwood, bergamot, geranium, honey essence, rose oil, vanilla, lemon oil, orange oil, cassia, caraway, cognac, jasmine, ylang-ylang, sage, fennel, piment, ginger, anise, coriander, coffee, or a mint oil from any species of the genus Mentha), flavor enhancers, bitterness receptor site blockers, sensorial receptor site activators or stimulators, sugars and/or sugar substitutes (e.g., sucralose, acesulfame potassium, aspartame, saccharine, cyclamates, lactose, sucrose, glucose, fructose, sorbitol, or mannitol), and other additives such as charcoal, chlorophyll, minerals, botanicals, or breath freshening agents. They may be imitation, synthetic or natural ingredients or blends thereof. They may be in any suitable form, for example, oil, liquid, or powder.

As used herein, an "aerosol generating agent" is an agent that promotes the generation of an aerosol on heating. An aerosol generating agent may promote the generation of an aerosol by promoting an initial vaporization and/or the condensation of a gas to an inhalable solid and/or liquid aerosol.

In general, suitable aerosol generating agents include, but are not limited to: a polyol such as sorbitol, glycerol, and glycols like propylene glycol or triethylene glycol; a non-polyol such as monohydric alcohols, high boiling point hydrocarbons, acids such as lactic acid, glycerol derivatives, esters such as diacetin, triacetin, triethylene glycol diacetate, triethyl citrate or myristates including ethyl myristate and isopropyl myristate and aliphatic carboxylic acid esters such as methyl stearate, dimethyl dodecanedioate and dimethyl tetradecanedioate. In some cases, the aerosol generating agent comprises one or more of glycerol, propylene glycol, triacetin and isopropyl myristate, suitably glycerol and/or propylene glycol.

The weight ratio of aerosol generating agent to tobacco (dry weight) may be from about 2:1 to about 1:3, suitably from 3:2 to about 1:2, suitably about 1:1.

The method according to the invention may additionally comprise an initial step of adding water to the tobacco. The amount of water added may be from about 2% to about 20% based on the dry weight of tobacco, suitably from about 2%, 5% or 8% to about 12%, 15%, 18% or 20%. This pre-treatment with water increases the transfer of polar tobacco components (such as flavors) from the tobacco to the entrapment solvent.

In the process according to the invention, a higher pressure and temperature under supercritical conditions increases the solvent capacity and increases the efficiency of extraction. However, more energy is required to achieve and maintain higher pressures and temperatures and such conditions can lead to decomposition of volatile tobacco components, such as flavors and aromas.

Thus, the supercritical conditions in steps (a) and (d) are suitably selected to balance these conflicting requirements.

The transfer to subcritical conditions reduces the fluid density of the extraction solvent and consequently results in precipitation of the tobacco components. The conditions must be such that the pressure is below the critical pressure of the extraction solvent and/or the temperature is below the critical temperature of the extraction solvent. For thermal efficiency, the conditions are suitably such that the pressure is below the critical pressure of the extraction solvent while the temperature remains above the critical temperature.

The efficiency of separation of the tobacco components and the extraction
  solvent improves as the conditions move further below the critical point of the extraction solvent. However, the extraction solvent will typically be collected and stored after separation (requiring compression); in some cases, it may be recycled into an extraction chamber. Thus, the subcritical conditions are suitably not too far below the critical point to improve energy efficiency. The subcritical conditions are suitably selected to balance these conflicting requirements. Where the extraction solvent comprises carbon dioxide, the pressure at which extraction occurs may, in some cases, be from about 3 MPa, 4 MPa, 5 MPa or 5.5 MPa to about 7.3 MPa, 7 MPa, 6.5 MPa, 6 MPa, 5.5 MPa or 5 MPa, suitably from 3-7.3 MPa, or 4-6 MPa. Where the extraction solvent comprises carbon dioxide, the temperature of the subcritical conditions under which separation occurs may, in some cases, be from about 280K, 300K, 320K or 330K to about 473K, 430K, 390K or 350K, suitably from 308-473K, 308-430K, or 328-350K.

EXAMPLES

Analytical Methods

Water activity values reported below were measured at 24.9-25.2° C. using the Aqualab Prewater Activity meter. The values were determined using the dewpoint method.

Viscosity values reported below were measured at 25° C. using a Gemini Rheometer from Bohlin Instruments.

Pre-Extraction (Pre-Treatment of Tobacco):

Ground Virginia tobacco leaf of the particle size ranging from 355 μm to 3.5 mm was pre-treated by addition of water (10% of total tobacco weight). The mixture of tobacco and water was left for equilibration for 15 minutes post water addition (which is sufficient time for the water to be fully absorbed).

The pre-treated tobacco (1.2 kg plus 10 wt % water) was placed in a stainless steel extraction basket and the basket placed in an extraction vessel (5 L autoclave). The basket was closed at its ends by sinter metal plates (pore diameter 100 μm, pressure drop across the plate is no more than 1 bar), which distributed the supercritical fluid at the entrance and prevented egress of solid particles at the exit. The use of the basket also allowed the fast charge and discharge of the extraction vessel. The basket was sealed against the extraction vessel wall in order to prevent flow of the supercritical fluid around it.

Example 1: Example of Process According to the Invention

The extraction vessel was linked to a separation vessel by a transfer line. A pressure regulation valve was present in the line. Carbon dioxide may suitably be
  pumped through the system at the rate 5-23 kg/hr. In this case, carbon dioxide was pumped through the system at the rate of 10 kg/hr. 1.2 kg of glycerol was provided in the separation vessel. The separation chamber was maintained at 4.5 MPa and 318K.

During a first extraction step, the conditions in the extraction vessel were 10 MPa and 318K. The first extraction conditions were maintained for 1 hour. The glycerol was then drained from the separation chamber.

Supercritical $CO_2$ at these conditions has a density of approximately 628.7 kg/m$^3$. This solvent has a relatively low solvent power resulting in a gentle extraction of the volatile (low molecular weight) compounds. At such a low temperature the volatiles decomposition is minimized. These conditions also minimize the extraction of nicotine and non-volatiles and avoids the co-extraction of the high-molecular weight compounds.

Gaseous $CO_2$ exited the separator after passing through a liquid/gas divider (which removed any remaining liquid extract that was entrained in the gas). The $CO_2$ was collected and recycled into the extraction chamber.

| Virginia tobacco | Nicotine (mg/g) | Water (wt %) | NNN (ng/g) | NNK (ng/g) | Viscosity (Pa s) | pH | Density (g/cm$^3$) | Water activity (Aw) |
|---|---|---|---|---|---|---|---|---|
| Extracted at 10 MPa and 318K | 0.62 | 1.53 | 21.8 | 12 | 0.66 | 5.59 | 1.26 | 0.07 |

A further 1.2 kg of fresh glycerol was then placed in the separation chamber in preparation for the second extraction step. During the second extraction step, the conditions in the extraction vessel were 26 MPa and 338K. These conditions were maintained for 2 hours, after which the entire system was depressurized and the extract was drained from the separation chamber.

The second extraction step is completed at this higher pressure and for longer time than the first extraction step in order to extract the maximum amount of nicotine from tobacco leaves.

Supercritical $CO_2$ at these conditions has the density of approximately 771.2 kg/m$^3$. This increased density means that the solvent power is increased, and higher molecular weight compounds are extracted.

Gaseous $CO_2$ exited the separator after passing through a liquid/gas divider (which removed any remaining liquid extract that was entrained in the gas). The $CO_2$ was collected and recycled into the extraction chamber.

| Virginia tobacco | Nicotine (mg/g) | Water (wt %) | NNN (ng/g) | NNK (ng/g) | Viscosity (Pa s) | pH | Density (g/cm$^3$) | Water activity (Aw) |
|---|---|---|---|---|---|---|---|---|
| Extracted at 26 MPa and 338K | 7.25 | 5.85 | 175 | 85 | 0.33 | 6.83 | 1.24 | 0.2 |

Further, the inventors observed that the extract obtained by extraction under the first set of conditions has a pale yellow color. The extract obtained by extraction under the second set of conditions has a darker yellow color because it contains more nicotine.

Example 2: Example of Process According to the Invention

The pre-extraction treatment and the subsequent processing steps of example 1 were repeated, except that Burley tobacco was used as the starting material. The resulting extracts are characterized below:

| Burley tobacco | Nicotine (mg/g) | Water (wt %) | NNN (ng/g) | NNK (ng/g) |
|---|---|---|---|---|
| Extracted at 10 MPa and 318K | 1.95 | 1.32 | 691 | 49.2 |
| Extracted at 26 MPa and 338K | 19.443 | 6.09 | 2187 | 266 |

Comparative Test

A comparative test was run using the same apparatus as in example 1. However, the conditions were supercritical (26 MPa and 338K) throughout the apparatus and the extraction was completed in a single step. All other aspects of the comparative test were the same as in example 1.

The comparative test is a representative example of the processes described generally in EP1915064.

| Virginia tobacco | Nicotine (mg/g) | Water (wt %) | NNN (ng/g) | NNK (ng/g) | Viscosity (Pa s) | pH | Density (g/cm$^3$) | Water activity (Aw) |
|---|---|---|---|---|---|---|---|---|
| Comp. test | 4.7 | 5.5 | 71.1 | 49.1 | 0.32 | 6.73 | 1.25 | 0.24 |

Similar results have been observed when using Oriental or Burley starting tobaccos.

The various embodiments described herein are presented only to assist in understanding and teaching the claimed features. These embodiments are provided as a representative sample of embodiments only, and are not exhaustive and/or exclusive. It is to be understood that advantages, embodiments, examples, functions, features, structures, and/or other aspects described herein are not to be considered limitations on the scope of the invention as defined by the claims or limitations on equivalents to the claims, and that other embodiments may be utilized and modifications may be made without departing from the scope of the claimed invention. Various embodiments of the invention may suitably comprise, consist of, or consist essentially of, appropriate combinations of the disclosed elements, components, features, parts, steps, means, etc., other than those specifically described herein. In addition, this disclosure may include other inventions not presently claimed, but which may be claimed in future.

The invention claimed is:

1. A method of making a tobacco extract, the method comprising:
    (a) contacting tobacco with an extraction solvent at a first temperature and first pressure which are selected such that the extraction solvent is supercritical, such that tobacco flavor and/or aroma components are extracted from the tobacco into the solvent;
    (b) separating the residual tobacco solids from the supercritical extraction solvent containing tobacco components;
    (c) exposing the extraction solvent containing the tobacco flavor and/or aroma components to conditions in a vessel at which the extraction solvent is subcritical, thereby releasing the tobacco components from the extraction solvent,
    (d) contacting the residual tobacco solids with the extraction solvent at a second temperature and second pressure which are selected such that the extraction solvent is supercritical, such that nicotine is extracted from the tobacco into the extraction solvent; and wherein the second temperature and/or second pressure is higher than the respective first temperature or first pressure;
    (e) separating the residual tobacco solids from the supercritical extraction solvent containing the nicotine;

(f) exposing the extraction solvent containing the nicotine to conditions in the vessel at which the extraction solvent is subcritical, thereby releasing the nicotine from the extraction solvent, wherein at (f), the vessel contains a first entrapment solvent which dissolves the nicotine released from the extraction solvent, and wherein the entrapment solvent comprises an aerosol generating agent, the aerosol generating agent promoting the generation of an inhalable aerosol on heating.

2. The method according to claim 1, wherein a second entrapment solvent is present in the vessel at (c).

3. The method according to claim 2, wherein the second entrapment solvent used at (c) is retained and used at (f) as the first entrapment solvent.

4. The method according to claim 1, wherein the extraction solvent comprises carbon dioxide.

5. The method according to claim 4 wherein at (a), the temperature is in the range of about 308-473K and the pressure is in the range of about 8-85 MPa.

6. The method according to claim 1, wherein the entrapment solvent comprises a polyol.

7. The method according to claim 1, further comprising:

(g) mixing the liquid fraction resulting from (c) with the liquid fraction resulting from (f).

8. The method according to claim 1, further comprising providing the entrapment solvent containing dissolved tobacco components in a cartridge, wherein the cartridge is configured for use in a smoking article.

9. The method according to claim 1, wherein the method comprises an initial step of adding water to the tobacco.

10. The method according to claim 9, wherein the amount of water added to the tobacco is from about 2% to 20% based on the dry weight of the tobacco.

11. The method according to claim 9, wherein the tobacco has a particle size range of from 355 μm to 3.5 mm.

12. The method according to claim 11, wherein the tobacco is ground Virginia tobacco leaf.

* * * * *